(No Model.) 5 Sheets—Sheet 1.

J. H. REED.
BUTTON HOLE STITCHING AND BARRING MACHINE.

No. 378,404. Patented Feb. 21, 1888.

WITNESSES.
J. M. Dolan.
Fred. B. Dolan.

INVENTOR.
James H. Reed,
by his atty
Charles F. Raymond (No Model.) 5 Sheets—Sheet 2.

J. H. REED.
BUTTON HOLE STITCHING AND BARRING MACHINE.

No. 378,404. Patented Feb. 21, 1888.

WITNESSES. INVENTOR.

(No Model.) 5 Sheets—Sheet 3.

J. H. REED.
BUTTON HOLE STITCHING AND BARRING MACHINE.

No. 378,404. Patented Feb. 21, 1888.

WITNESSES.
J. M. Dolan.
Fred. B. Dolan.

INVENTOR.
James H. Reed,
by his atty
Clarke & Raymond.

(No Model.)  5 Sheets—Sheet 4.

J. H. REED.
BUTTON HOLE STITCHING AND BARRING MACHINE.

No. 378,404. Patented Feb. 21, 1888.

WITNESSES.
J. M. Dolan.
Fred. B. Dolan.

INVENTOR.
James H. Reed.
by his attys
Clarke & Raymond (No Model.) 5 Sheets—Sheet 5.

J. H. REED.
BUTTON HOLE STITCHING AND BARRING MACHINE.

No. 378,404. Patented Feb. 21, 1888.

WITNESSES.
J. M. Dolan,
Fred. B. Dolan,

INVENTOR.
James H. Reed,
by his attys
Clarke & Raymond.

UNITED STATES PATENT OFFICE.

JAMES H. REED, OF LYNN, MASSACHUSETTS.

BUTTON-HOLE STITCHING AND BARRING MACHINE.

SPECIFICATION forming part of Letters Patent No. 378,404, dated February 21, 1888.

Application filed March 3, 1887. Serial No. 229,624. (No model.)

*To all whom it may concern:*

Be it known that I, JAMES H. REED, of Lynn, in the county of Essex and State of Massachusetts, a citizen of the United States, have invented a new and useful Improvement in Button-Hole Stitching and Barring Machines, of which the following is a full, clear, and exact description, reference being had to the accompanying drawings, forming a part of this specification, in explaining its nature.

The invention is an improvement upon that described in my application for Letters Patent filed December 16, 1886, Serial No. 221,721, and it relates to a button-hole stitching or button-hole stitching and barring machine having a clamp-plate adapted to be automatically returned at the end of its feed movement to its original position; also a means or mechanism for providing the clamp-plate with a feed movement; also an automatic stop-motion for automatically stopping the machine at the completion of the barring of the button-hole. It also relates to various details of construction and organization, all of which will hereinafter fully appear.

Figure 1:
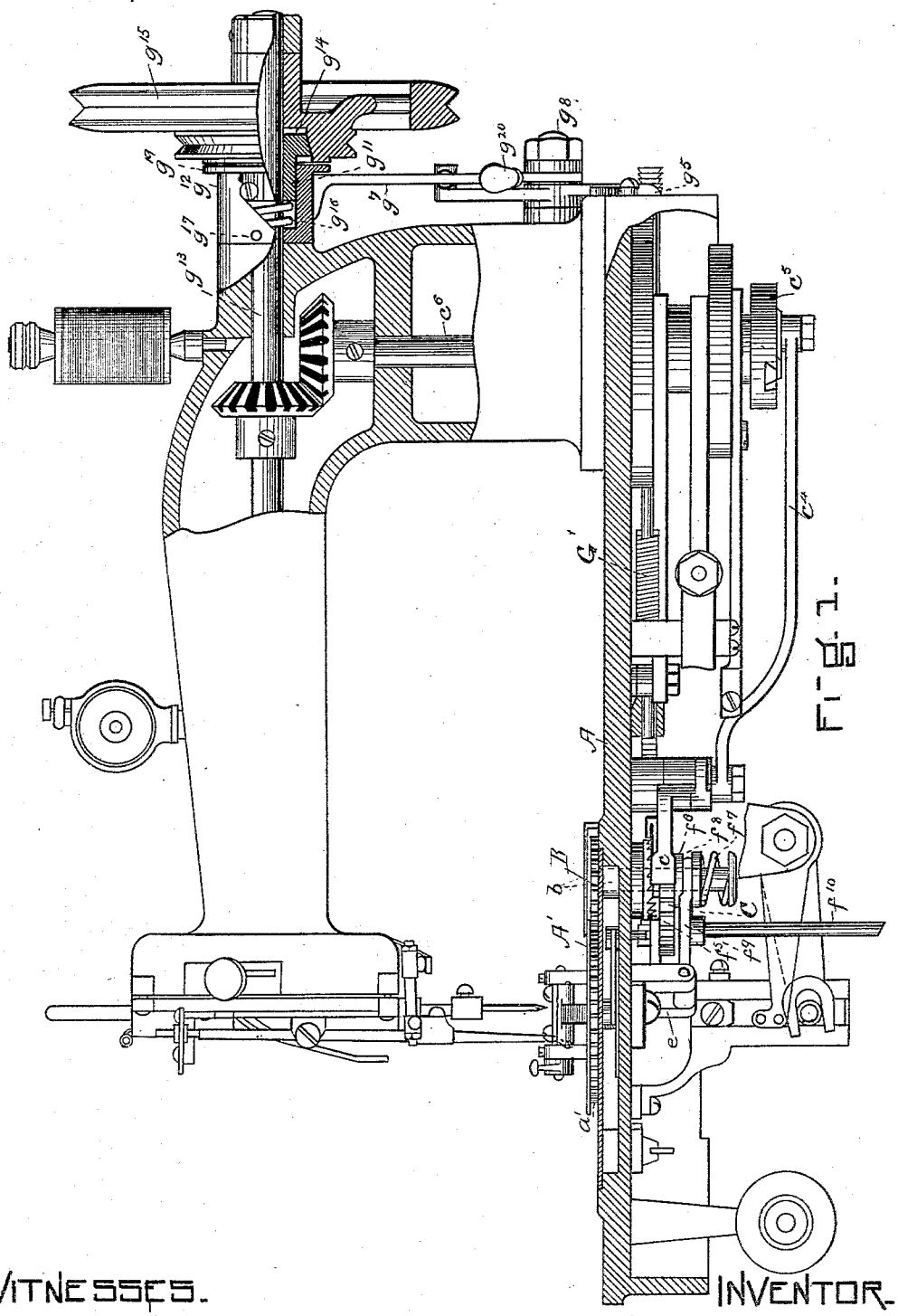
Figure 2:
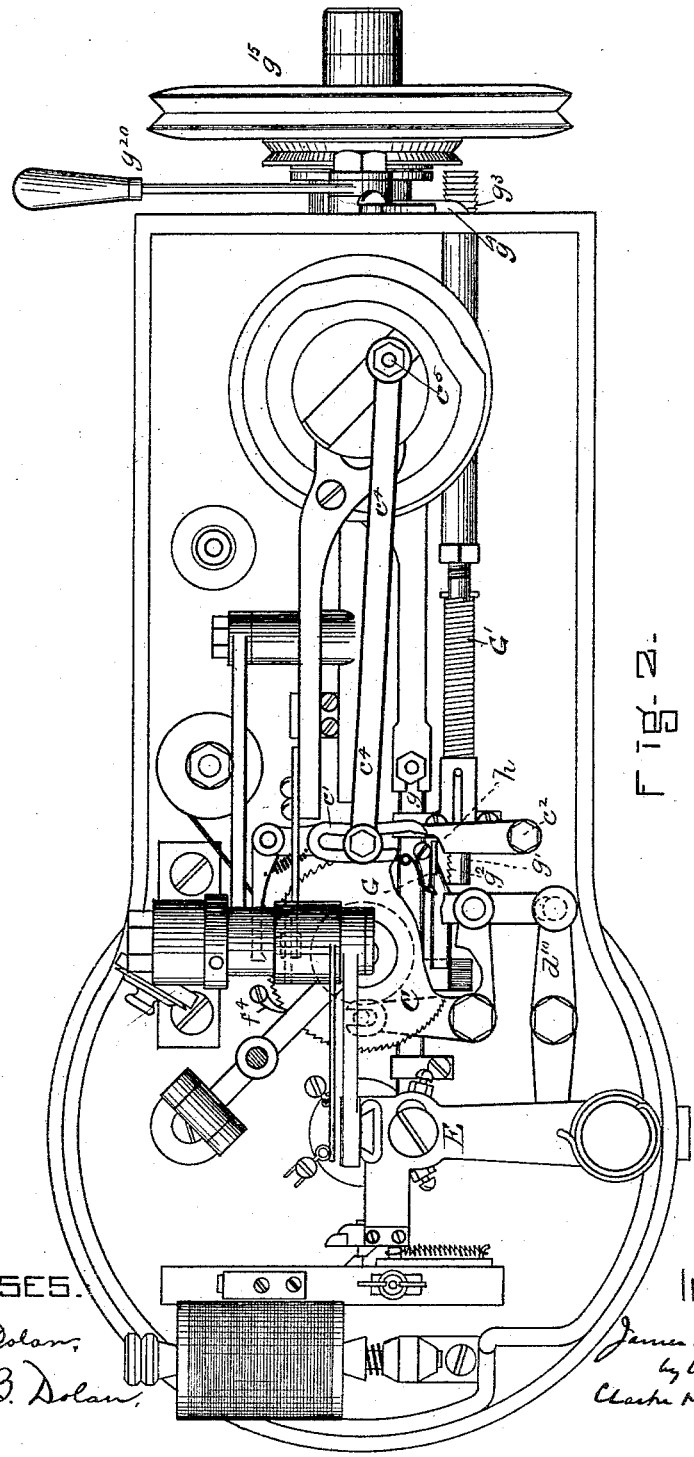
Figure 3:
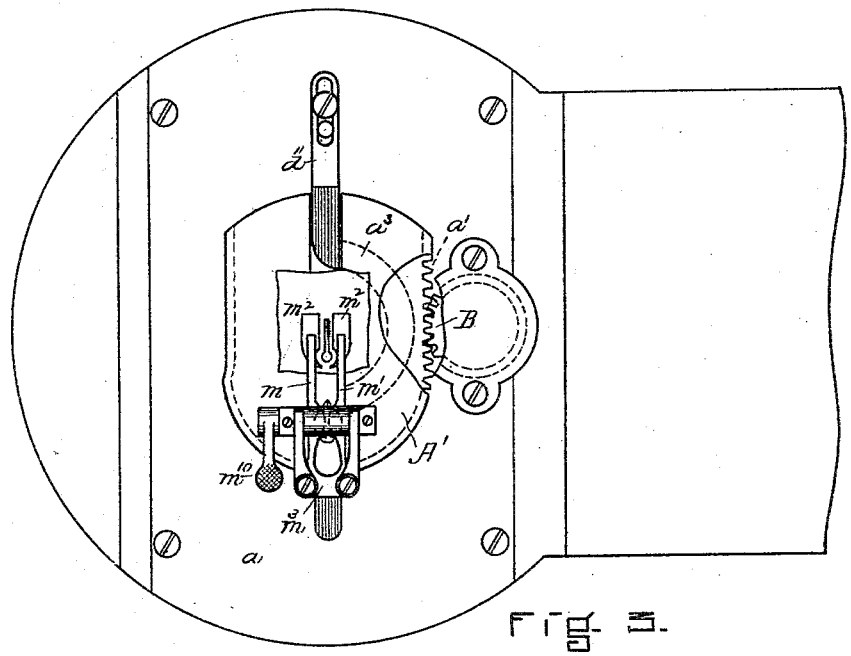
Figure 4:
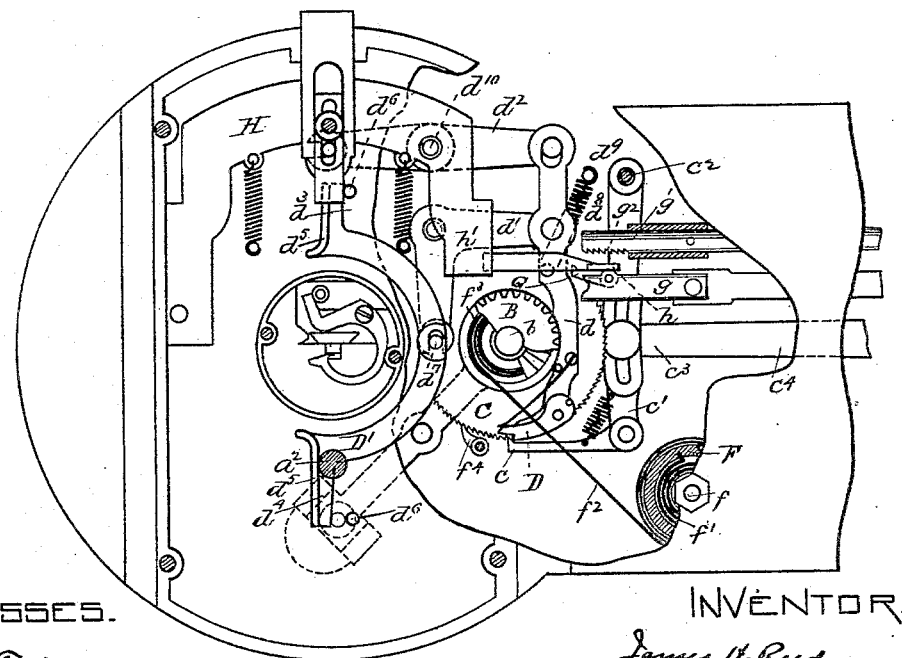
Figure 5:
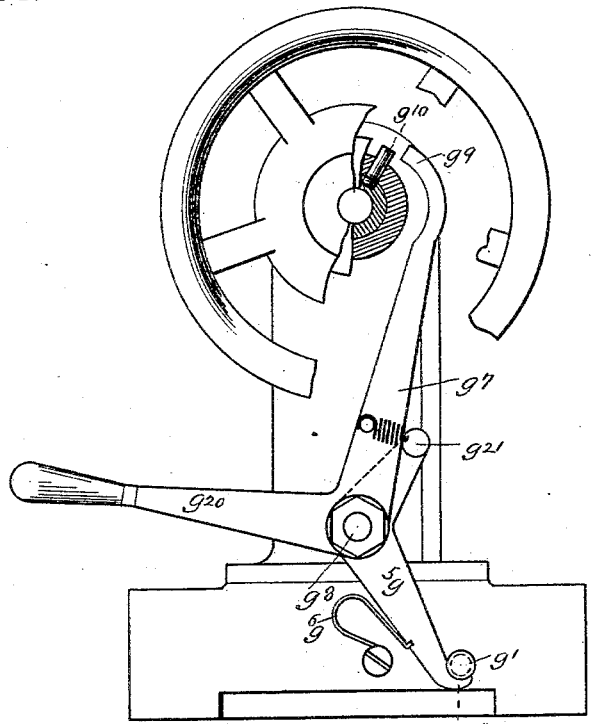
Figure 8:
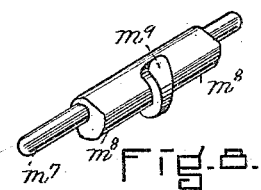
Figure 6:
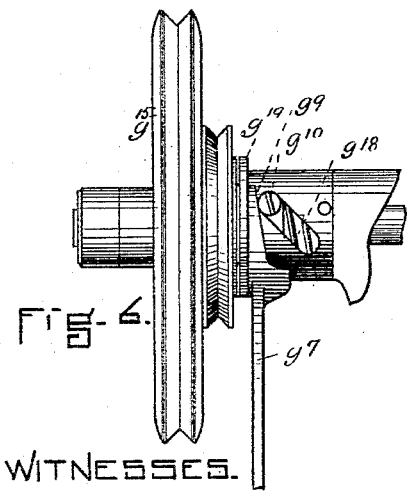
Figure 7:
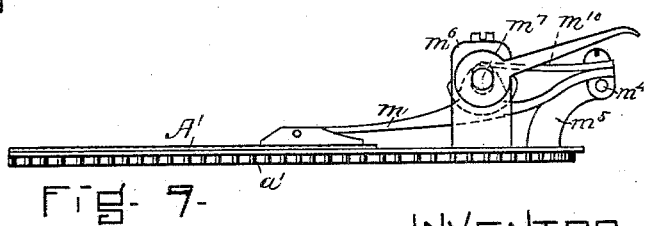
Figure 7:
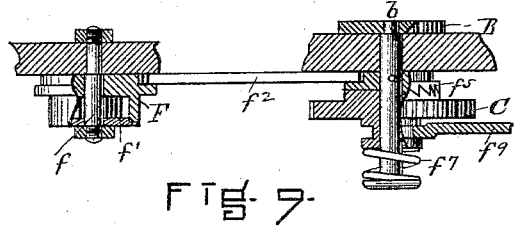
Figure 10:
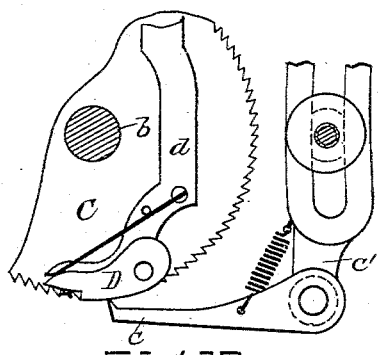
Figure 11:
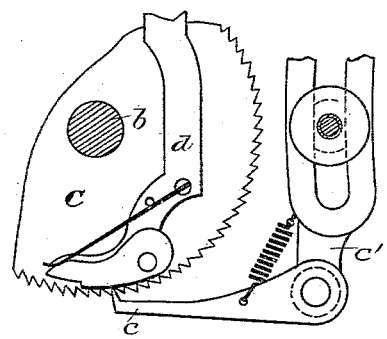
Figure 13:
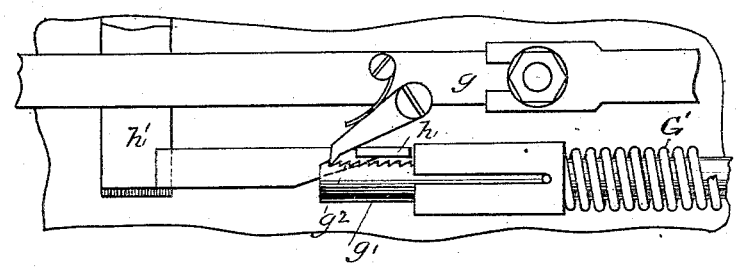
Figure 12:
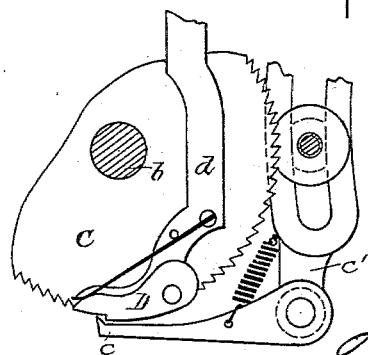

Referring to the drawings, Figure 1 is a view showing, part in vertical section and part in side elevation, a machine having the features of my invention. Fig. 2 is a view in plan of a machine in an inverted position. Fig. 3 is a view in plan of the bed of the machine and the work-plate and clamp-plate thereon. Fig. 4 is a view, principally in plan, of the parts below the work-plate. Fig. 5 is a view, part in section and part in end elevation, to illustrate a portion of the stop-motion mechanism. Fig. 6 is a detail view thereof. Fig. 7 is a view to illustrate the clamp-plate and also the work-clamp carried thereby. Fig. 8 is a view in perspective of a part of the work-clamp. Fig. 9 is a view illustrating a portion of the mechanism for feeding the clamp-plate and also for returning it automatically to its original position. Figs. 10, 11, 12, and 13 are detail views.

A is the bed-plate of the machine.

$a$ (see Fig. 3) is the work-plate.

A' (see Figs. 1 and 3) is the clamp-plate which carries the work-clamping and spreading devices, which will hereinafter be described. The clamp-plate A' has formed upon its edge the teeth $a'$. (See Figs. 1, 3, and 7.) These teeth extend on both sides of the plate and about its rear end. The clamp-plate also has the pin $a^2$, (shown in Figs. 1 and 4,) which enters the guide-slot $a^3$ in the work-plate $a$, (shown in dotted outline in Fig. 3,) and of a form common to other button-hole-stitching machines, the guide-slot being of a shape to cause the clamp-plate to be moved in presenting its work to the button-hole-stitching mechanism first forward in relation to the button of the machine, then upon an arc of a circle about the same, and then again forward.

To move the clamp-plate and work held thereon by the clamp in relation to the button and stitch-forming devices of the machine, I have arranged a gear-wheel, B, (see Figs. 1, 3, and 4,) at the upper end of the shaft $b$ to engage the teeth $a'$ of the clamp-plate, and this gear is provided with intermittent rotation by means of the ratchet-wheel C, (see Figs. 1, 2, and 4,) which is carried by the shaft $b$ and connected with the gear B, as will hereinafter be described, the feed-pawl $c$, carried by the lever $c'$, (see Fig. 4,) which is pivoted at $c^2$, and which is engaged by the end $c^3$ of the feed-bar $c^4$, the feed-bar $c^4$ being operated by the crank $c^5$ (see Fig. 2) on the vertical shaft $c^6$. The connection between the feed-bar $c^4$ and the lever $c'$, preferably, is such as to provide an adjustment of the end of the arm horizontally in relation to the pivot $c^2$ of the lever. This is represented as accomplished by means of a slot formed in the said lever $c'$ and a headed clamping stud and nut movable in said slot adapted to lock the bar $c^4$ to the lever at any point within the limits of the length of the slot. This feed-pawl $c$ is given a longer throw than is necessary for the feeding of the clamp-plate when upon the straight portions of the guide-slot $a^3$. This increased movement is given in order that it may, when the clamp-plate is being turned about the button—that is, when the clamp-pin is in the curved portion of the guide-slot and the eye of the button is being stitched—provide it with a more rapid movement; and I then utilize the full movement or throw of the feed-pawl by moving from the path of reciprocation of the pawl the plate D, which is held in such relation to the edge of the ratchet-wheel and the feed-pawl that the feed-pawl, upon its backward movement, comes in contact with the outer surface of the plate and, because of its shape, is removed from contact with the ratchet-teeth and held from contact therewith, so that upon its forward movement it does not engage the ratchet-teeth as soon as it otherwise would were the plate not there. This pawl-guide plate D, I have represented as hinged to a lever, $d$, which is supported and actuated by the rock-lever $d'$, which serves to withdraw it from the line of movement of the feed-pawl $c$, and the lever $d^2$, which serves to move the lever in a reverse direction from that in which it is moved by the rock-lever $d'$, and so as to move it outward sufficiently far to entirely disengage the feed-pawl $c$ from the ratchet. This movement is given the plate D to stop the feed of the clamp-plate during the barring of the button-hole, and the pawl $c$ then reciprocates upon the outer edge of the plate, and does not engage the ratchet-wheel in any part of its reciprocation. The first of these movements, or that which is given it through the rock-lever $d'$, which is a withdrawing movement of the plate to permit the pawl to engage more teeth of the ratchet upon each reciprocation, is communicated to the lever by means of a lever or plate, D'. (See Fig. 4.) This plate is of the general form of the guide-slot $a^3$, and has upon each end section, $d^3 d^4$, (see Fig. 4,) a raised ledge or extension, $d^5$, which extends upward into the path of the guide-pin $a^2$ of the clamp-plate, and this plate D' has a horizontal movement to cause the said ledges or extensions $d^5$ to bear against the said guide-pin $a^2$ when in the straight portion of the guiding-slot $a^3$, and to follow it as it moves therefrom into the curved portion of the slot. It therefore follows that while the pin is in the straight portion of the slot the plate D' is held back against spring-pressure, which would otherwise tend to throw it outward, and that upon the passage of the guide-pin from the straight portion of the guide-slot into the curved portion thereof the plate is released sufficiently to be moved by its spring laterally a short distance, and it is returned, upon the movement of the guide-pin $a^2$ from the curved portion of the slot into the straight portion—that is, the plate D' is moved backward to its original position, or the end of the plate with which the pin then comes in contact—because it is desirable that the plate should be hung or supported so as to act as a lever—that is, to be moved by each end rather than to be moved bodily. This effect is obtained by placing a pin, $d^6$, (see Fig. 4,) near each end of the plate or lever D', and against which the front edge thereof shall alternately come in contact, and which shall act alternately as the fulcrum upon which the plate is moved. In Fig. 4 one end of the plate is represented as in contact with a pin, $d^6$, while the other end is represented as moved back from its fulcrum-point; and this would indicate that the feed-pawl $c$ was then being held off by the plate D from the ratchet-wheel a portion of its reciprocation—in other words, that it would give the clamp-plate its short-distance feed-movement—and that the clamp-plate was being moved to stitch the sides of the button-hole. When, however, the guide-pin passes from the straight portion of the guide-slot into the curved, the end of the plate held from the pin $d^6$ then comes in contact with it, and this movement of the clamp is communicated to the rock-lever $d'$ directly, one end of the rock-lever being connected by the pin $d^7$, (see Fig. 4,) with the plate or lever D' at the center of its length.

$d^8$ is the spring which serves to draw the said plate D' outward, as above specified, and it acts through the rock-lever $d'$, the spring being fastened rigidly at $d^9$ at one end, and its other end being fastened to the end of the rock-lever, where it engages the arm or lever $d$.

To operate the arm or lever $d$ to entirely disengage the feed-pawl $c$ from the ratchet C, it is necessary to move the arm $d$ in a reverse direction from that in which it is moved by the plate D' and lever $d'$, and also to move it at the end of the stitching of the side of the button-hole and immediately at the beginning of the sewing of the bar. This movement is given the said arm or lever $d$ by means of the lever $d^2$, which is pivoted at $d^{10}$, and which is connected with or carries the block $d^{11}$, (see Fig. 3,) which extends through the guide-slot $a^3$ near its end in a position to be moved by the clamp-plate, the edge of which comes in contact therewith, so that upon such movement of the block by the clamp-plate the lever $d^2$ is caused to throw or move the arm or lever $d$ sufficiently to cause the plate D to be moved into a position to throw the feed-pawl $c$ from engagement with the teeth of the ratchet-wheel C, and to hold it disengaged therefrom during its subsequent reciprocations. This block $d^{11}$ is also connected with the tripping-block which releases the arm E, carrying the lower needle, to permit it to be moved by its actuating-spring to its barring position, in the manner described in said pending application.

To return the clamp-plate automatically to its original position after the stitching of the button-hole, I employ a drum, F, (see Fig. 4,) adapted to be rotated upon its shaft $f$ in opposition to the resistance of the helical spring $f'$, the drum being of a size and shape to receive a cord, $f^2$, and the spring being under comparatively little tension when the cord is wound on the drum. The cord is fastened at its other end to a drum, $f^3$, (see Fig. 4,) which is upon the shaft $b$, and upon the forward feed movement of the clamp the rotation of the shaft $b$, by means of the feed-pawl $c$ and ratchet-wheel C, causes the cord to be wound upon the drum $f^3$ in opposition to the stress of the spring $f'$, which of course is being increased in tension as the cord is unwound from the drum F; and a detent, $f^4$, (see Fig. 2,) serves to lock the ratchet-wheel C against the stress of the spring.

To permit the spring to throw or move the clamp-plate backward to its original position, I have employed a clutch, $f^5$. (See Fig. 1.) This clutch $f^5$ is in two parts. One part is attached to the drum, which, with the spur-gear B, is rigidly secured to the shaft $b$, and the other part of the clutch is attached to the ratchet-wheel C, which is carried by a sleeve, $f^6$, vertically movable in opposition to the spring $f^7$ upon the said shaft $b$. This sleeve has a grooved collar, $f^8$, which receives a yoke, $f^9$, at the upper end of a vertically movable rod, $f^{10}$, and this rod may be moved downward by a treadle, (not shown,) or by a lever, or automatically, and upon its downward movement it draws the member of the clutch attached to the ratchet-wheel C, the ratchet-wheel, and its sleeve downward upon the shaft $b$, in opposition to the stress of the spring $f^7$, until the upper part of the clutch is released or the spring $f'$ operates to rotate the drum F, and, through the cord, the drum $f^2$, and the gear B, moving it continuously in an opposite direction from that in which it is moved to feed the plate, so that the clamp-plate is returned in the same direction that it was fed with an automatic movement but continuously.

The automatic stop-motion mechanism comprises a reciprocating feed-pawl, G, (see Fig. 2,) carried by the looper slide-bar $g$, a horizontally-movable rod, $g'$, having at its inner end the ratchet-teeth $g^2$, so located as to be operated by the feed-pawl G at the desired time. This rod $g'$ has at its outer end the circular notches $g^3$, which are adapted to receive the end $g^4$ of a lever, $g^5$, a spring, $g^6$, serving to keep the end of the lever pressed against the bar. The notches are so shaped, however, that the lever offers little or no resistance to the inward movement of the bar by the feed-pawl G. The rod serves to hold the lever until it has been moved by the feed-pawl G sufficiently to permit the lever to move by its end, which lever then moves the lever $g^7$, which is pivoted at $g^8$, so that its upper end, $g^9$, which in effect is a movable wedge-block, (see Fig. 5,) is brought into line with the pin $g^{10}$, or to the position represented in Fig. 6. This pin $g^{10}$ is connected with the movable sleeve or member $g^{11}$ of a clutch which is arranged to slide in the sleeve $g^{12}$ upon the main shaft $g^{13}$, and the end of which is enlarged and tapered to fit the enlarged tapered hole $g^{14}$ in the hub of the pulley $g^{15}$. A coiled spring, $g^{16}$, serves to move the member $g^{11}$ of the clutch into contact with the pulley, and the rotation of the shaft continues so long as the two parts of the clutch are in contact. Upon moving the member $g^{11}$ away from the hub of the pulley of course the pulley rotates without rotating the shaft.

The sleeve $g^{12}$ is fastened to the shaft by screws $g^{17}$, and the movable member $g^{11}$ of the clutch is connected with the shaft by the pin $g^{10}$, which passes through the inclined slot $g^{18}$ in said sleeve. The sleeve $g^{12}$ has a flange, $g^{19}$, which acts as a support for the end $g^9$ of the lever—that is, the flat side of the lever bears against the flange. The other surface of the end of the lever is inclined, (see Fig. 10,) so that the end of the lever having been brought into position between the pin $g'$ and the flange $g^{19}$, as represented in said figure, upon a continuation of the rotation of the shaft the pin is caused to be moved by the incline away from the flange $g^{19}$ to move the movable member $g^{11}$ of the clutch from engagement with the pulley.

The lever $g^7$ has a limited amount of lost motion in relation to the lever $g^5$, so that it may be operated or moved to stop the machine by means of the handle $g^{20}$. The lever $g^5$ communicates movement to the lever $g^7$ by means of the pin $g^{21}$—that is, when the rod $g'$ has been moved sufficiently to permit the lever $g^5$ to be thrown by its spring past its end, the pin $g^{21}$, coming in contact with the lever $g^7$, throws the wedge end $g^9$ into operative position.

The feed-pawl G is held from engagement with the teeth $g^2$ upon the end of the connecting-rod $g'$ until the beginning of the barring of the button-hole by means of a holding-plate, $h$, which is interposed between a portion of the pawl and the ratchet-teeth $g^2$, so that while the pawl is continuously, or substantially continuously, reciprocating it is held from engagement with the teeth $g^2$ until the plate $h$ has been moved close to the teeth. To accomplish this the plate is attached to the end of the arm $h'$ of the slide-plate H, which is connected with the movable block $d^{11}$, operated by the clamp-plate, so that upon the contact of the clamp-plate with the block $d^{11}$ the said plate $h$ is gradually moved toward the ratchet-teeth until the feed-pawl $c$ is disengaged by the movement of its moving block D from the ratchet-wheel C and the feed stopped. At that instant the plate $h$ is in position to permit the feed-pawl G upon its next reciprocation to engage the first in order of the ratchet-teeth $g^2$, which is exposed or uncovered by the plate $h$, and every subsequent reciprocation of the feed-pawl G advances the rod $g'$ under the teeth until finally its end is moved by the end $g^3$ of the lever, and the lever thereby caused to actuate the stop-motion. This enables me to obtain any desired number of stitches for the bar, according to the position which the ratchet-teeth $g^2$ of the rod $g'$ bears to the feed-pawl G, and this position is determined by the notches $g^3$ at the end of the bar and the latch-lever $g^5$, the rod being moved so that the end of the lever shuts into the second, third, fourth, fifth, or other notch from the end thereof. If, for instance, it is shut into the fourth notch, it will bring the fourth ratchet-tooth from the end of the ratchet into line to receive the feed-pawl G, so that the rod will be moved with an intermittent movement by the feed-pawl G the distance of four teeth, and thereby permit the stitching of four barring-stitches before the stop-motion mechanism is actuated. A spring, G', surrounds the rod $g'$ and acts to return it to its original position upon the release of the feed-pawl G and of the lever $g^5$.

The work-clamping device is shown in Figs. 3, 7, and 8, and comprises the arms $m\ m'$, each of which supports at its end a foot, $m^2$, pivoted thereto by horizontal pivots. These arms $m\ m'$ are formed from a single plate of metal, and they are attached at the end $m^3$ to two ears, which are shaped to receive the horizontal pivot $m^4$, by which the arms are pivoted to a bracket, $m^5$, extending upward from the clamp-plate. There is arranged upon each side of the clamp-plate a stud, $m^6$, which supports the cross-shaft $m^7$ over the plate. This cross-shaft has two eccentrics, $m^8$, and a curved wedge, $m^9$, and the shaft is adapted to be turned by the arm or lever $m^{10}$. The eccentrics bear upon the upper surface of the arms $m\ m'$, respectively, and the wedge is adapted to be moved between them, the arms being shaped at this point to receive the wedge and to be separated by it. Flat springs $m^{10}$ extend from the rear end of the arms $m\ m'$ to the shaft $m^7$, upon which they bear, and serve to lift the arms $m\ m'$ and their feet and hold them.

In the operation of clamping the material on the clamp-plate it is placed beneath the feed between the under surface and upper surface of the clamp-plate, and so as to bring the button-hole slit between the feet, and upon the downward movement of the lever $m^{11}$ the eccentrics are brought to bear upon the upper surface of the arms $m\ m'$ and move them down in opposition to the springs $m^{10}$, and a further movement of the arms brings the wedge between the two arms and moves it, causing the wedge to separate or move the arms apart from each other, and to thereby cause the feet and the work held thereby to be moved apart, thereby opening the button-hole slit.

The stitch-forming and barring mechanism employed is like that described in my said application, and does not need to be but briefly mentioned here. It comprises two straight needles, one of which is reciprocated from above the clamp-plate and the other from below it, the lower needle being supported by a support which is adapted to be automatically moved at the end of the stitching of the last side of the button-hole to increase the distance or space between it and the upper needle, in order that the longer stitch used in the barring may be sewed.

The upper and lower looping devices are like those described in said application, as are also the take-ups, with the exception of the lower take-up, which is slightly, though not materially, different.

The operation of the machine is as follows: The work having been clamped upon the clamp-plate, the machine is set in operation by the movement of the handle $g^{20}$ to disengage the holding end of the lever $g^9$ from the pin $g^{10}$, to permit the movable member of the clutch to be thrown into contact with the pulley, and the clamp-plate is then fed or moved forward with an intermittent movement by means of the gear B and the feed-pawl $c$, the intermittent movement of the clamp-plate being regular and uniform during the stitching of one side of the button-hole and until the clamp-plate guiding-pin enters the curved portion of the clamp-plate guide, when the movement of the clamp-plate is accelerated, the feed-pawl being permitted to throw more teeth of the ratchet and move the gear B a greater portion of a revolution each movement. This accelerated intermittent movement of the clamp-plate continues during the stitching of the eye, or while it is in the semicircular part of the guide-slot. At the end of this semicircular movement the movement of the clamp-plate is again reduced to that which prevailed at its start, and it so continues until the end of the stitching of the side of the button-hole, when the feed-pawl is automatically disengaged from the ratchet, the gear B rests, the lower needle is automatically transferred, the longer barring-stitches commenced, and as many made as have been predetermined by the number of ratchet-teeth left to be moved by the pawl G, and at the end of the movement of this rod the stop-motion is automatically operated and the machine caused to stop.

The device for automatically returning the clamp-plate is then caused to be operated, if not operated automatically, and the clamp-plate returns to its normal position, the guide-pin moving backward through the guide-slot, turning the plate a half-revolution as it moves, until it has reached its original position.

I would say that I do not confine or limit the invention to the especial forms of mechanical detail herein specified, but may use in lieu thereof any mechanical equivalents therefor.

Having thus fully described my invention, I claim and desire to secure by Letters Patent of the United States—

1. The combination, in a button hole machine, of a bed-plate having a guiding-slot, $a^3$, clamp-plate A', having a pin to enter said guiding-slot, and the teeth $a'$, the gear B, arranged to engage said teeth $a'$, and a ratchet and feed-pawl for moving said gear intermittingly in one direction, and mechanism—such as a draw-cord actuated by a spring or equivalent power, and adapted to be wound upon a drum carried by the gear-shaft for rotating the gear continuously in a reverse direction—whereby the clamp-plate is fed forward with an intermittent movement during the stitching of the sides and eye of the button-hole and is automatically returned by a continuous movement to its original position, as and for the purposes described.

2. The combination, in a button-hole-stitching machine, of the clamp-plate A', having the movements specified, its driving-gear B, mounted upon a shaft, $b$, a drum carried by said shaft, having one end of a draw cord or chain attached thereto, and a second drum upon which the cord or chain is in part wound before the movement of the gear B to wind the cord or chain upon the drum connected therewith, and a spring for communicating a rotary movement to the said second drum, as and for the purposes described.

3. The combination, in a button-hole stitching machine, of the clamp-plate A', having the movements specified, its driving-gear B, mounted upon the shaft $b$, a drum carried by said shaft having one end of a draw cord or chain attached thereto, and upon which the cord or chain is in part wound upon the movement of the gear B, and a spring connected with the said second drum and adapted to be wound to have its tension increased by the movement of the drum upon the unwinding of the cord or chain therefrom, and a clutch or releasing device for releasing the shaft $b$, substantially as described.

4. The combination of the clamp-plate A', guided in relation to the stitch-forming devices as specified, and having the teeth $a'$, the gear B, adapted to mesh or engage with the teeth $a'$, and mounted upon a shaft, $b$, a barrel for receiving a drawing cord or chain, also mounted upon said shaft, and a member of a clutch fastened thereto, with a ratchet-wheel having a section of a clutch fastened thereto and made movable vertically upon said shaft, whereby its section of the clutch is adapted to engage with the first-named section and to be disengaged therefrom, the feed-pawl $c$ upon the lever $c'$, and means for vibrating the same, and detent upon the lever $d$, and means for operating the same, substantially as described.

5. The combination of the clamp-plate, the driving-gear B, its ratchet-wheel, and a reciprocating pawl engaging the ratchet, and means for vibrating the same, whereby the driving-gear is rotated in one direction, and a spring-drawn cord or chain for rotating the gear B in a reverse direction, as and for the purposes described.

6. The combination of the clamp-plate driving-gear B, its shaft $b$, carrying the driving ratchet-wheel, and a clutch, one member of which is fastened to the ratchet-wheel and the other to the shaft, and means for moving said ratchet-wheel vertically upon said shaft, and for bringing its clutch into engagement with the fast member of the clutch, substantially as described.

7. The combination of the clamp-plate driving-gear B, its shaft, a ratchet-wheel carried thereby, a feed-pawl having a reciprocating movement imparted to it, a holding-plate for varying the position of the feed-pawl in relation to the ratchet-teeth, whereby the operative extent of its movement is varied, the arm $d$, carrying said plate, and the movable plate D', connected with said plate $d$ by the bent lever $d'$, and adapted to be moved by the clamp-plate pin $a^2$, and the spring $d^8$, substantially as described.

8. The combination of the work-plate having the groove $a^3$, the clamp-plate having a pin, $a^2$, the clamp-plate driving-gear B, a ratchet and pawl for intermittingly moving the same, a plate, D', having the ledges or extensions $d^5$, arranged in relation to the guide-slot, as specified, the fulcrum-pins $d^6$, and a pawl-moving plate, D, connected with said plate D', whereby upon its movement the plate D' is moved relatively to the feed-pawl, as and for the purposes described.

9. The combination of the clamp-plate, the feeding-gear B, a ratchet and feed-pawl for intermittingly rotating it, the pawl-moving plate or arm D, supported by the lever $d$, the lever $d^2$, connected with the movable block $d^{11}$, and the spring $d^8$, substantially as described.

10. In a button-hole stitching and barring machine, the combination of a clamp-plate and means for feeding the same, with a stop-motion mechanism comprising a reciprocating pawl, G, a connecting-rod, $g'$, having ratchet-teeth $g^2$ for controlling the position of an operating releasing-block, $g^9$, with said releasing-block, and a movable member of a clutch having a pin, $g^{10}$, adapted to be brought in contact with the releasing-block $g^9$, when said block is moved into position to engage it, as and for purposes described.

11. The combination, in a button-hole stitching and barring machine, of a clamp-plate and means for moving the same, with a movable rod, $g'$, adapted to release the mechanism for disengaging the driving member of a clutch, having teeth adapted to be engaged by a reciprocating pawl, with said reciprocating pawl, and a plate or arm for holding said pawl from engagement with said teeth until the completion of the last side of the button-hole, and then adapted to be moved by contact of the clamp-plate with a movable block connected with said holding-plate, as and for the purposes described.

12. The combination of the reciprocating pawl G, the clamp-plate and means for feeding it, a holding-plate governed as to its position by the clamp-plate, as specified, a releasing-bar or rod, $g'$, having the ratchet-teeth $g^2$, and the notches $g^3$, with automatic stop-motion mechanism for moving the driving member of the clutch from the driven member of the clutch, substantially as described.

13. The combination, in a button-hole stitching and barring machine, of the clamp-plate and means for feeding it, the bar $g'$, operated as specified, and having notches $g^3$, with the lever $g^5$, one end of which engages said notches and the other of which communicates motion to the lever $g^7$, with said lever $g^7$, the driving member of a clutch and the driven member $g^{11}$, having a pin by which it is moved out of engagement with the driving member upon coming in contact with the end $g^9$ of the lever, substantially as described.

14. The combination, in a button-hole stitching and barring machine, of the clamp-plate and means for feeding it, the driving member of a clutch loose upon the shaft which it drives, the driven member of a clutch, $g^{11}$, fastened to a sleeve secured to the shaft by a pin which extends through an inclined slot therein, a spring for moving the driven member of the clutch in contact with the driving member, and maintaining that position, and a wedge arm or block adapted to be moved into a position to be engaged by said pin, whereby said pin upon coming in contact therewith is caused to move the driven member of the clutch from engagement with the driving member, substantially as described.

JAMES H. REED.

Witnesses:
ARTHUR SIBLEY,
C. B. TUTTLE.